Figure 5:
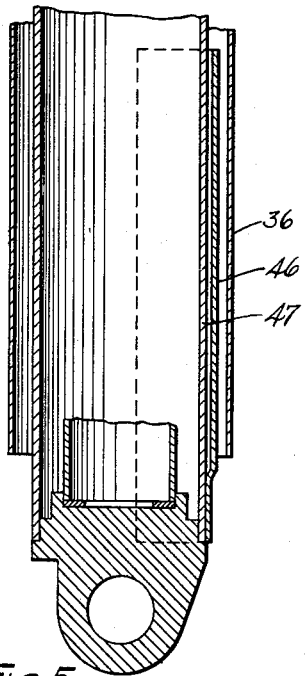

Sept. 7, 1937.    J. E. PADGETT    2,092,259
SHOCK ABSORBER
Filed May 7, 1934    2 Sheets-Sheet 1
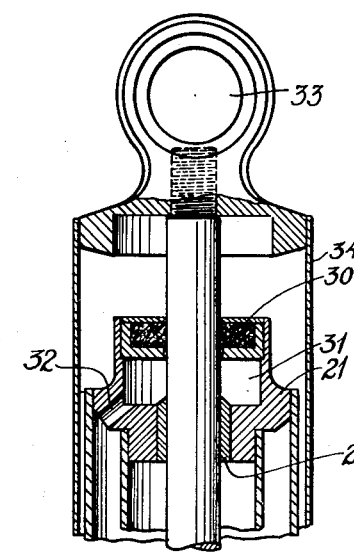
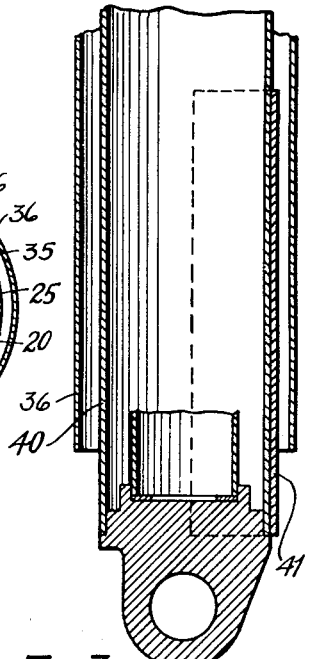
Fig.2
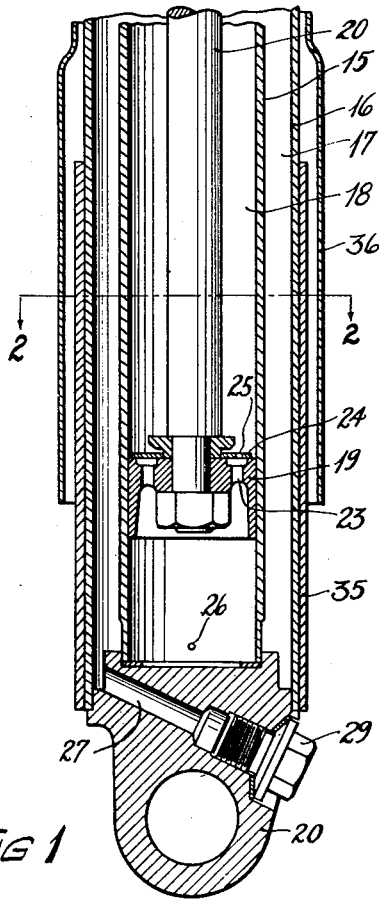
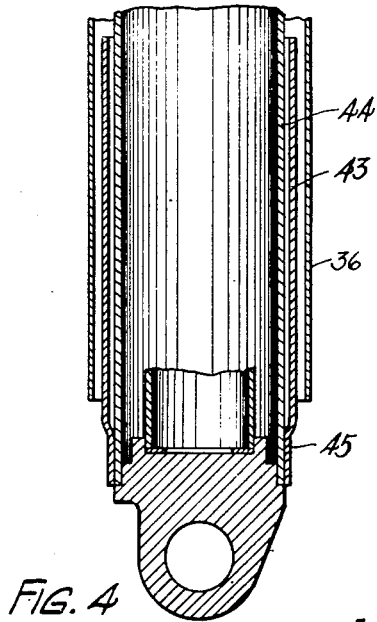
Fig.3
Fig.4
Fig 1
INVENTOR
JOSEPH E. PADGETT
Kwis, Hudson & Kent
ATTORNEYS Sept. 7, 1937.   J. E. PADGETT   2,092,259
SHOCK ABSORBER
Filed May 7, 1934   2 Sheets-Sheet 2

INVENTOR
JOSEPH E. PADGETT
Kurr, Hudson & Kent
ATTORNEYS

Patented Sept. 7, 1937

2,092,259

UNITED STATES PATENT OFFICE 2,092,259

SHOCK ABSORBER

Joseph E. Padgett, Toledo, Ohio, assignor, by mesne assignments, to General Motors Corporation, Detroit, Mich., a corporation of Delaware Application May 7, 1934, Serial No. 724,318

3 Claims. (Cl. 188—88)

This invention relates to shock absorbers and more particularly to an improved shock absorber housing. The present invention is an improvement over the shock absorber disclosed in my early Patent No. 1,948,185, issued February 20, 1934.

In explanation of the problem to the solution of which the present invention is directed, I wish to point out that the shock absorber of my earlier patent mentioned above is of the type having housing and cylinder members formed from sections of metal tubing and, in the use of these shock absorbers, difficulties have been encountered by reason of the housing and, in some instances, the housing and cylinder members being damaged by objects striking the shock absorber. The housing and cylinder members when formed of sections of metal tubing are, in effect, formed of sheet metal and I have found that by reason of the exposed locations in which these devices are used on motor vehicles, the sheet metal walls are often subjected to severe blows, from stones being thrown up from the road or from other objects, which cause the walls to be bent and distorted or may even puncture the same. The shock absorbers used on the rear axles of vehicles are especially subject to these damaging blows, by reason of stones or other objects being thrown up from the road by the action of the front wheels.

It is, therefore, an object of the present invention to provide an improved shock absorber having a housing embodying means for preventing damage to the shock absorber by blows delivered against the device.

Another object of the invention is to provide an improved shock absorber housing having a guard mounted on the housing and extending along at least a portion of the wall thereof.

A further object of the invention is to provide an improved shock absorber housing having a laminated wall.

It is also an object of this invention to provide an improved fluid flow shock absorber having an elongated housing formed from a section of metal tubing and embodying a guard for the wall of the housing which is also formed from a section of metal tubing and which is coextensive with at least a portion of the wall of the housing.

Other objects and advantages of the invention will be apparent from the following description when taken in conjunction with the accompanying sheets of drawings, wherein Fig. 1 is a longitudinal sectional elevation taken through a shock absorber embodying my invention;

Fig. 2 is a transverse sectional view taken on line 2—2 of Fig. 1; and

Figs. 3 to 10, inclusive, are partial sectional views, which are more or less diagrammatic, showing several other constructions for a shock absorber housing as contemplated by my invention.

Detailed reference will now be made to the accompanying drawings wherein I have shown one form of shock absorber with which the protective means of my invention may be used and have also illustrated various ways in which the protective means may be applied to the shock absorber housing. It will be understood, of course, that the invention may be embodied in various other types of shock absorbers and that it may assume various specific forms other than those herein illustrated.

Before proceeding with the detailed description of the invention, I shall describe briefly the shock absorber which is illustrated in Figs. 1 and 2 as being one form of shock absorber with which the protective means of my invention may be advantageously used. The shock absorber illustrated in Figs. 1 and 2 is a direct acting shock absorber which is provided with a cylinder barrel 15 and a reservoir barrel or housing 16 arranged with a space therebetween forming a fluid chamber or reservoir 17. The barrel 15 forms the working cylinder 18 in which the piston 19 is operated by means of the piston rod 20. The cylinder and reservoir barrels 15 and 16 are connected and closed at their ends by means of the closure plugs 20 and 21 to which the cylinder and reservoir barrels may be welded, the latter plug having a bushing 22 therein in which the piston rod is slidable.

The piston of the shock absorber may be provided with openings 23 and with a check valve plate 24 having an orifice 25 therein, the check valve being arranged to restrict the flow of fluid past the piston as the latter moves toward the plug 20 and to further restrict the flow of fluid past the piston when the latter moves upwardly toward the plug 21. The working cylinder is substantially fluid-tight at its upper end, as shown in Fig. 1, and at its lower end has restricted connection with the reservoir through the normally open passage or orifice 26. This restricted passage limits the flow of fluid from the cylinder into the reservoir and thus cooperates with the valve 24 in resisting the downward travel of the piston to render the device double acting.

The cylinder and reservoir may be charged with the desired amount of resistance fluid, such as oil, through the opening 27, the outer end of which may be closed by the screw plug 29.

Leakage of fluid around the piston rod may be prevented during the operation of the device by a suitable packing 30 provided on the plug 21 and by a leakage collecting chamber 31 provided in this plug just inwardly of the packing. The leakage collecting chamber communicates with the upper end of the reservoir through a return passage 32.

A connecting eye 33 may be provided on the outer end of the cylinder rod 20 for connecting the latter with the frame or other part of the vehicle and, if desired, a dust guard 34 may be mounted on this member and arranged to telescope around the shock absorber housing 16.

The shock absorber as thus far described is generally similar to the shock absorber disclosed in my prior patent mentioned above, and when this shock absorber is mounted on a motor vehicle, for example on the rear axle of the vehicle, the device is in a more or less exposed position and the housing formed by the reservoir barrel is subjected to frequent blows by objects which are caused to be thrown up from the surface of the road by the action of the front wheels. I have found that, as the result of such blows, the shock absorber housing may be dented or become bent and, in some instances, even the cylinder barrel 15 may be dented or bent. It may also result in puncturing of the sheet metal housing or leakage of fluid at other points.

I have found that the mere thickening of the wall of the housing, as by using a heavy gauge of tubing for forming the wall, does not eliminate this difficulty, but that when the exposed portion of a sheet metal housing of usual thickness is provided with a protective layer or sheath of sheet material, the strength of such portion of the housing and its resistance to bending or denting by stones or other objects striking thereagainst, is increased many times over the resistance to distortion which would be offered by a wall constituting a single layer. This protective sheath or layer may be arranged in various ways, some of which have been illustrated in the drawings, and the application of such a sheath to the reservoir barrel of the shock absorber may be regarded as the equivalent of providing the shock absorber with a housing having a laminated wall.

In the shock absorber of Fig. 1 I have shown the sheath or guard 35 as being arranged outwardly of the reservoir barrel 16 but, obviously, it could be arranged inwardly of this barrel instead, if it were desirable. The sheath 35 may be formed as a section of sheet metal tubing of approximately the same gauge as the reservoir barrel 16 and when arranged outwardly of the reservoir barrel it may be of a size to telescope around the latter. The sheath 35 may be retained on the reservoir barrel 16 by any suitable means, for example, it may be welded at one or more points to the barrel or to some other available portion of the housing.

It will be understood, of course, that the sheath 35 may be made of sufficient length to cover and protect that portion of the sheet metal housing which may be exposed at any time during the operation of the device and, in this instance, I have shown the sheath extending for a considerable distance upwardly around the reservoir barrel 16. The dust guard 34 may, if desired, be arranged to telescope over the sheath 35 and, to avoid interference, the dust guard is preferably provided with an enlarged lower part 36.

In some instances it may be desirable to apply the sheath to certain portions only of the housing of the shock absorber, for example, when the shock absorber is applied to the rear axle it may, in some cases, only be necessary to apply the sheath to the forwardly disposed portion of the shock absorber housing or, in other words, on that side of the housing to which the striking objects would normally be directed during the operation of the vehicle. As an illustration of such an arrangement, I have shown a shock absorber housing 40 in Fig. 3 of the drawings to which such a partial sheath or guard 41 has been applied. The arrangement of Fig. 3 is substantially the same as that illustrated in Fig. 1 with the exception that the sheath 41 extends only part way around the shock absorber housing.

Beneficial results may be obtained when the sheath or guard, or at least a portion thereof, is spaced from the surface of the shock absorber housing and, in Fig. 4, I have shown an arrangement of this kind wherein a substantial portion of the length of the sheath 43 is spaced from the outer surface of the wall of the shock absorber housing 44. In this instance, the sheath 43 is shown as being tubular so as to extend all the way around the housing 44 and it may be mounted on the shock absorber housing by being provided with a reduced end 45 which is welded or otherwise secured to the housing.

In Fig. 5 of the drawings, I have shown a sheath or guard 46 applied to a shock absorber housing 47 but with the guard extending only part way around the housing. It will be understood, of course, that when such a partial guard is employed it will be mounted on the side of the housing toward which the striking objects would normally be directed during the operation of the vehicle.

Figure 6:
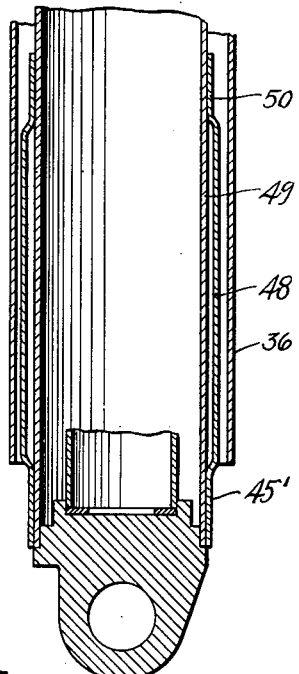

In Fig. 6 of the drawings, I have shown a sheath or guard 48 which is generally similar to that of Fig. 4 in that a substantial portion of the length of the guard is spaced from the surface of the shock absorber housing 49. In this arrangement, however, a reduced portion 50 is provided at the upper end of the sheath in addition to the reduced portion 45' at the lower end of the sheath. These reduced portions may be welded or otherwise secured to the housing 49 for mounting the sheath thereon.

Figure 7:
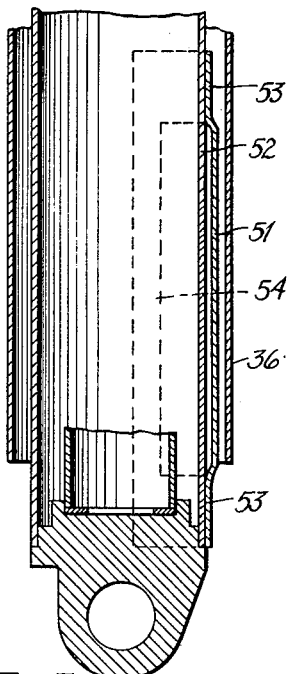

Fig. 7 of the drawings shows an arrangement similar to that of Fig. 6 but wherein the sheath 51 is a partial sheath extending only part way around the shock absorber housing 52. The upper and lower ends of this partial sheath may be provided with offset portions 53 for connecting the sheath with the shock absorber housing and, if desired, the vertical edges of the sheath may also be provided with offset portions 54 for connection with the shock absorber housing.

Figure 8:
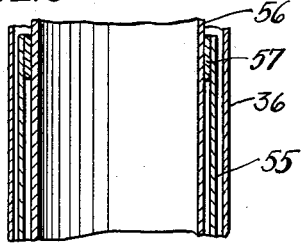
Figure 9:
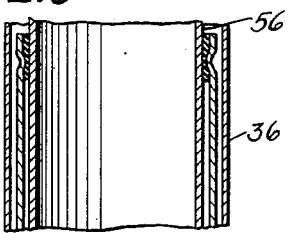
Figure 10:
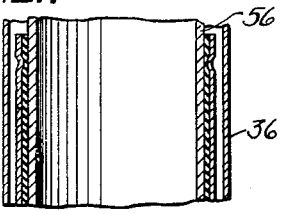

In Figs. 8, 9 and 10 of the drawings, I have shown a tubular sheath or guard 55 disposed around a shock absorber housing 56 and wherein means is provided between the sheath and the housing for spacing the same apart and for connecting the sheath to the housing. In Fig. 8, this interposed connecting means is a ring 57 which may be provided at one or both ends of the sheath. This ring may be formed of metal and may be connected to the sheath and to the shock absorber housing by welding or by any other suitable connection.

In the arrangement of Fig. 9 the interposed connecting means comprises a ring 58 of rubber or other yieldable material. This ring may be provided at one or both ends of the sheath and may be under compression between the sheath and the shock absorber housing so that the sheath will be retained on the latter. If desired, a portion of the sheath may be deflected inwardly as by rolling one or more grooves 59 in the outer surface of the sheath whereby the sheath would be locked to the rubber ring and the latter will be tightly pressed against the shock absorber housing.

In Fig. 10 the interposed connecting means between the sheath 55 and the shock absorber housing 56 is a sleeve 60 of resilient material, such as soft vulcanized rubber. The rubber sleeve may be connected to the sheath 55 and to the shock absorber housing in any suitable way. For example, the rubber sleeve may be stretched along the shock absorber housing to reduce its thickness and the sheath 55 then slipped over the rubber sleeve after which the sleeve is released and the contracting of the same into the space between the sheath and the shock absorber housing will lock these two members together. If desired, the connection between the sheath and the rubber sleeve and between the rubber sleeve and the shock absorber housing may be made by deflecting a portion of the sheath inwardly as by rolling one or more grooves 61 in the sheath similar to the groove 59 shown in Fig. 9.

It will be understood that in the several forms of the invention herein disclosed the sheath or guard embodied in the shock absorber housing increases the strength of the sheet metal wall of the housing, especially with respect to its resistance to deflection or bending by reason of stones or other solid bodies being projected thereagainst. This sheath imparts to the sheet metal wall of the housing something of the characteristics of a laminated wall structure with the beneficial effect that the wall of the sheet metal housing is especially able to resist accidental blows delivered thereagainst. It will be understood furthermore that the use of a shock absorber housing having a sheet metal wall is very desirable from the standpoint of economy of construction, and the present invention makes possible and practical the use of such an economical sheet metal structure.

While I have illustrated and described the improved shock absorber structure of my invention in a detailed manner it will be understood, of course, that I do not wish to be limited to the precise details of construction and arrangements illustrated and described, but regard my invention as including such changes and modifications as do not involve a departure from the spirit of the invention and the scope of the appended claims.

Having thus described my invention, I claim:

1. In a shock absorber a housing having a tubular sheet metal wall, a tubular sheet metal member disposed around and coextensive with a portion of said wall, and a rubber sleeve extending between said member and said wall.

2. In a shock absorber, a housing having a tubular sheet metal wall, a tubular sheet metal sheath disposed around and coextensive with a portion of said wall, forming an annular space between the housing and said sheath; and resilient means filling said space.

3. In a shock absorber, a tubular housing; a sheath arranged about said housing and spaced therefrom; and a resilient means filling the space between the housing and sheath.

JOSEPH E. PADGETT.